United States Patent Office 2,808,907
Patented Oct. 8, 1957

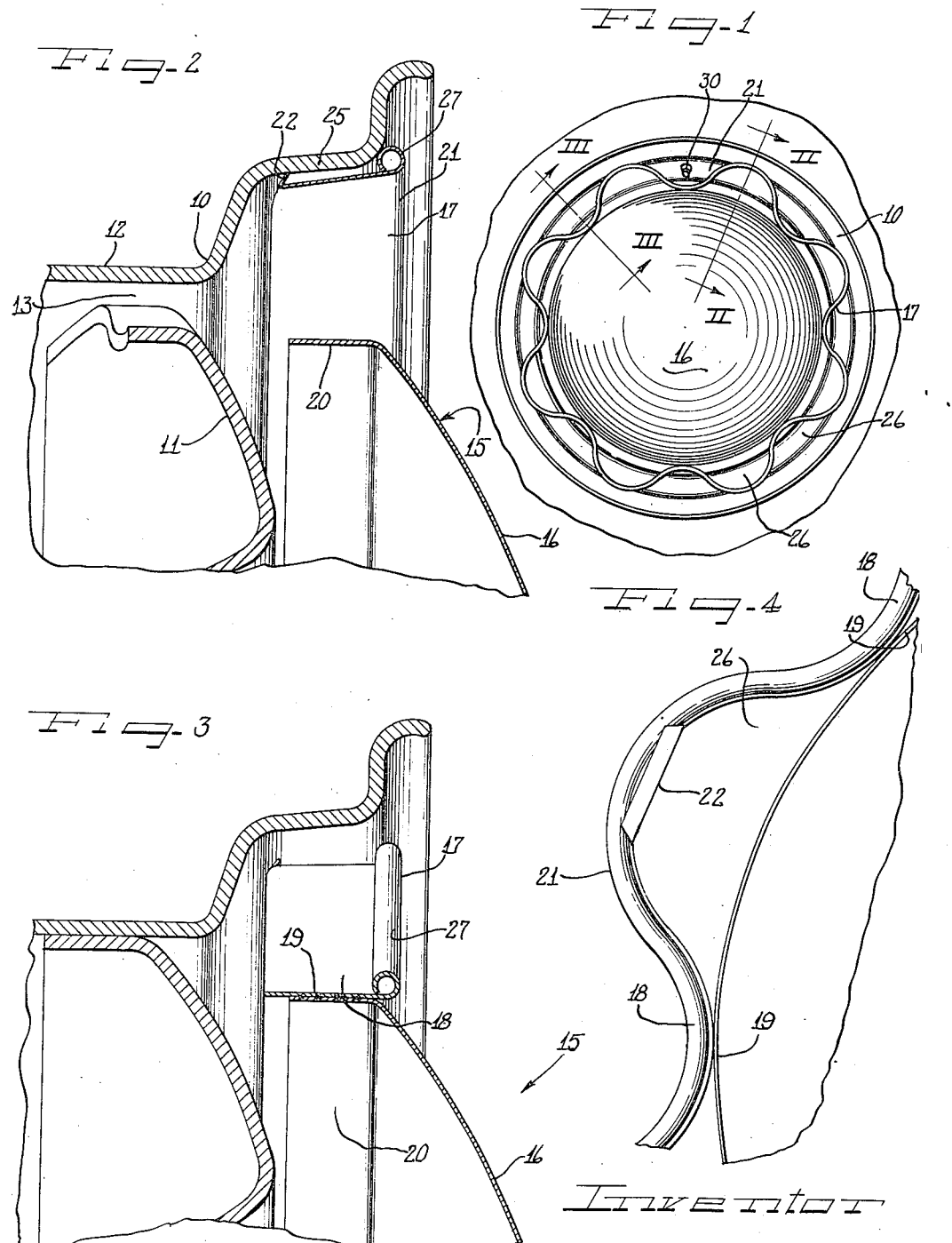

2,808,907

WHEEL STRUCTURE

George Albert Lyon, Detroit, Mich.

Application June 6, 1952, Serial No. 292,160

11 Claims. (Cl. 188—264)

This invention relates to wheel covers and more particularly to a snap on and off type of wheel cover having provided therein air circulating openings.

It is an object of this invention to provide an improved automobile wheel cover with air passageways and which lends itself to economical manufacture on a large production scale.

Another object of the invention relates to the provision of air passageway means in a wheel cover which also serves the additional purpose of retaining means for the cover and whereby the cover may be detachably retained on the wheel.

In accordance with the general features of this invention there is provided in a wheel cover for an automobile wheel, including tire rim and body parts, a circular cover member having attached to its peripheral margin a serpentine-shaped ring, alternate portions of which are secured to the cover member proper and the other portions of which are provided with resilient retaining fingers for detachable gripping engagement with the rim part of the wheel.

Another feature of the invention relates to so securing the loops of the serpentine retaining ring to the cover member proper that transverse openings are provided in the ring for cooperation with the air circulation openings customarily provided through the body part of a wheel for enhancing the cooling of a brake drum and the like associated with the axle of a vehicle to which the wheel may be applied in service.

Other objects and features of this invention will more fully appear from the following detailed description taken in connection with the accompanying drawing which illustrates a single embodiment thereof and in which:

Figure 1 is a fragmentary side elevation of a wheel structure having applied thereto my novel wheel cover;

Figure 2 is an enlarged fragmentary cross sectional view taken on substantially the line II—II of Figure 1 looking in the direction indicated by the arrows and showing how one of the retaining fingers of the cover ring cooperates with the rim part of the wheel in the retention of the cover on the wheel;

Figure 3 is a fragmentary cross sectional view similar to Figure 2 but taken on the line III—III of Figure 1 looking in the direction indicated by the arrows and showing one of the points of attachment of the serpentine ring to the cover member; and Figure 4 is a fragmentary end or edge view of a portion of the cover looking downward in Figure 2 and showing the construction of the retaining finger on one of the loops of the ring.

As shown on the drawings:

The reference character 10 designates generally a conventional multi-flanged drop center type of tire rim which is carried in the usual way upon a central body or spider part 11. This body part 11 is attached in the usual way at spaced intervals to the base flange 12 of the rim part 10, leaving transverse wheel openings 13 between the points of attachment whereby air can circulate freely through the wheel and around the brake drum (not shown).

Cooperable with this standard type of automobile wheel is a wheel cover embodying the features of this invention and designated generally by the reference character 15. This wheel cover includes principally two parts, namely, a central cover member 16 proper and an outer marginal generally axially inwardly extending cover-retaining flange construction, in the present instance comprising a serpentine retaining ring 17 attached thereto. The central cover part 16 comprises a crowned or dished stamping made from any suitable sheet metal such, for example, as stainless steel and extends over substantially the entire wheel body part 11 on the outer side of the wheel.

The serpentine or sinuous ring 17 has a plurality of portions at least some of which provide finger portions, and radially inwardly indented portions for stiffening the finger portions. To this end, the flange ring 17 has alternate loops 18 fastened at 19 as by means of welding or the like to the outer marginal flange 20 of the central cover part 16. These alternate loops 18 project radially inwardly, whereas the other loops 21 project alternately radially outwardly and are each provided with an angular retaining extremity or finger 22. Each of the fingers 22 extends at an acute angle relative to the plane of the loop portion or, in other words, extends obliquely radially and axially outwardly from the serpentine ring. Any suitable number of loops may be used in the ring, although I have illustrated the ring in the drawing as being provided with eight loops with fingers since I have found that excellent retaining results may be obtained by the use of eight fingers.

Each of the angular fingers 22 is adapted to have a resilient camming engagement with the surface of an inclined flange 25 of the tire rim part 10. Also, it will be noted that between this flange 25 and the flange 20 of the cover part 16 the serpentine ring defines a plurality of transverse air openings 26 extending through the serpentine loops and aligned with the wheel openings 13.

I also preferably provide the serpentine ring 17 with a rolled or beaded edge 27 on its axially outer side providing a stop shoulder structure which is adapted to abut the flange 25 when the cover is on the wheel to limit inward movement of the cover.

In addition, it will be clear from Figure 1 that the usual valve stem 30 extending from the tire rim part 10 can project through one of the openings 26 in the ring so as to be accessible from the exterior of the wheel when the cover is on the wheel.

In the application of the cover to the wheel the cover is first placed over an outer side of the wheel with the valve stem 30 aligned with one of the openings 26 in the ring. Thereafer the cover is pressed axially into the body of the wheel until the finger loop portions 21 are generally telescoped into the rim flange 25 and the cover bottoms against the rim at its beaded stop edge 27. During the course of this application of the cover to the wheel the angular fingers 22 are cammed resiliently and radially inwardly as they progressively ride along the inclined radially inner surface of rim flange 25. It will be observed that the indented loop portions 18 stiffen the finger loop portions 21 and enhance resilient tensioned engagement of the finger portions with the radially inner surface of the rim flange 25. This results in the fingers 22 having a resilient or tensioned gripping engagement with the wheel rim and which is sufficient to retain the cover on the wheel against accidental displacement.

On the other hand, when it is desired to remove the cover, the same may be very easily and expeditiously effected by inserting the end of a blunt instrument, such as a screwdriver, in and through one of the ring openings 26 and applying a twisting pry-off pressure to the ring. In this manner the ring can be sprung off of the wheel. It will also be feasible to remove the cover by inserting the end of such an instrument under the beaded edge 27 and applying a twisting or pry-off force to the cover.

Now it will be perceived from the foregoing description that the serpentine ring on the periphery of the cover serves several advantageous functions. In the first place, it provides the cover with a highly ornamental and unique appearance. In the second place, it defines air passageways through which air can freely circulate through the cover from or to the conventional wheel openings 13. Lastly, but more important still, the serpentine ring performs the highly important function of detachably and resiliently retaining the cover on the wheel and against accidental displacement.

It should be appreciated that my wheel cover lends itself to economical manufacture on a large production scale. As noted before, the central cover part may comprise a stamping which is very economical to make on presses. Likewise, the ring 17, which is a continuous ring, may be made from a rolled section which is subjected to suitable press operations to give it its serpentine shape and to provide it with the spaced fingers 22 and the beaded edge 27.

I claim as my invention:

1. In a wheel structure including flanged rim and body parts, a circular cover member proper having a peripheral marginal flange and a serpentine ring extending circumferentially around said flange, said ring having radially inwardly extending loop portions fastened to the peripheral cover flange and having radially outward loop portions alternating with the inner ones and provided with cover retaining portions for engagement with a flange of the rim part.

2. In a wheel structure including flanged rim and body parts, a circular cover member proper having a peripheral marginal flange and a serpentine ring extending circumferentially around said flange, said ring having radially inwardly extending loop portions fastened to the peripheral cover flange and having radially outward loop portions alternating with the inner ones and provided with cover retaining portions for engagement with a flange of the rim part, said retaining portions of the serpentine ring comprising a series of circumferentially spaced angular fingers, each extending in an inclined plane radially and axially outwardly for gripping engagement with a surface of a flange of the rim part.

3. As an article of manufacture, a wheel cover having a central circular member and having its peripheral portion provided with a serpentine ring, alternate loops of which are formed into cover retaining portions, said ring having an axially outer edge turned to define a reinforced bead against which a pry-off force may be applied in the removal of the cover from a wheel to which the cover may be applied.

4. As an article of manufacture, an automobile wheel cover including a central dished portion and a serpentine ring portion projecting from the periphery of the central portion with spaced loops bearing against the central portion, and other loops alternating therewith projecting radially outwardly from the periphery of the dished portion and having thereon radially outwardly projecting means engageable retainingly with a portion of a wheel with which the cover may be assembled.

5. In a wheel structure including a tire rim and a body provided with air circulation openings adjacent the tire rim, a cover for disposition at the outer side of the wheel comprising a central cover body for overlying the wheel body and having its margin opposite the radially inner sides of said wheel openings, a series of radially outwardly extending loops projecting from the margin of the cover body and provided with generally axially directed portions having on the axially inner parts thereof means engageable with the tire rim, said loops affording air circulation passageway for air circulating through said wheel openings, and means on the axially outer parts of said axially directed portions of the loops serving as stops engageable with a generally axially outwardly projecting portion of the rim to delimit the axially inward disposition of the cover on the wheel.

6. In a wheel structure including a tire rim and a body provided with air circulation openings adjacent the tire rim, a cover for disposition at the outer side of the wheel comprising a central cover body for overlying the wheel body and having its margin opposite the radially inner sides of said wheel openings, and means providing a series of radially outwardly extending loops projecting from the margin of the cover and affording air circulation passageway for air therethrough and through said wheel openings, certain of said loops having radially outwardly projecting resilient cover retaining structure thereon retainingly engageable with the tire rim in press-on, pry-off relation.

7. In a wheel structure including a tire rim with a flange having a generally radially inwardly facing inner surface, a cover over the wheel having an outer marginal generally axially inwardly extending cover-retaining flange construction having a plurality of portions generally telescoped into the rim flange and at least some of which telescoped portions provide resilient rim-flange-inner-surface-engaging finger portions, said flange construction having radially inwardly indented portions at the sides of each of said finger portions for stiffening the finger portions and enhancing resilient tensioned engagement of the finger portions with the rim flange inner surface.

8. A wheel structure as defined in claim 7, wherein said flange construction comprises a separate ring and the cover has a central portion that is secured to said ring.

9. A wheel structure as defined in claim 7, wherein said flange construction includes, in addition, shoulder means thereon engageable with the tire rim for defining the axially inward disposition of the cover on the wheel.

10. A wheel structure as defined in claim 7, wherein said indented portions provide air circulation openings at the periphery of the cover and the wheel includes air circulation openings therethrough with which the air passages provided by said indented portions communicate.

11. In a wheel structure including a tire rim with a flange having a generally radially inwardly facing inner surface, a cover over the wheel having an outer marginal generally axially inwardly extending cover-retaining flange construction having a plurality of portions generally telescoped into the rim flange and at least some of which telescoped portions provide resilient rim-flange-inner-surface-engaging finger portions, said flange construction being of generally sinuous formation with said finger portions alternating with radially relatively offset portions which provide at the sides of each of the finger portions means for stiffening the finger portions and enhancing resilient tensioned engagement of the finger portions with the rim flange inner surface.

References Cited in the file of this patent

UNITED STATES PATENTS

| 1,931,946 | Zerk | Oct. 24, 1933 |
| 1,943,620 | Murray | Jan. 16, 1934 |
| 2,006,639 | Horn | July 2, 1935 |
| 2,092,975 | Hunt et al. | Sept. 14, 1937 |
| 2,115,182 | Sinclair | Apr. 26, 1938 |
| 2,119,991 | Hunt | June 7, 1938 |
| 2,137,288 | Horn | Nov. 22, 1938 |
| 2,368,238 | Lyon | Jan. 30, 1945 |
| 2,433,854 | Lyon | Jan. 6, 1948 |
| 2,725,257 | Maurer et al. | Mar. 29, 1955 |